United States Patent
Marass et al.

(10) Patent No.: US 12,472,329 B2
(45) Date of Patent: Nov. 18, 2025

(54) TORQUEABLE STEERABLE SHEATHS

(71) Applicant: St. Jude Medical, Cardiology Division, Inc., St. Paul, MN (US)

(72) Inventors: Timothy S. Marass, Minneapolis, MN (US); Andrew Oliverius, St. Paul, MN (US)

(73) Assignee: St. Jude Medical, Cardiology Division, Inc., St. Paul, MN (US)

( * ) Notice: Subject to any disclaimer, the term of this patent is extended or adjusted under 35 U.S.C. 154(b) by 524 days.

(21) Appl. No.: 16/647,133

(22) PCT Filed: Sep. 13, 2018

(86) PCT No.: PCT/US2018/050850
§ 371 (c)(1),
(2) Date: Mar. 13, 2020

(87) PCT Pub. No.: WO2019/055635
PCT Pub. Date: Mar. 21, 2019

(65) Prior Publication Data
US 2021/0121663 A1    Apr. 29, 2021

Related U.S. Application Data

(60) Provisional application No. 62/558,688, filed on Sep. 14, 2017.

(51) Int. Cl.
*A61M 25/01* (2006.01)
*A61M 25/00* (2006.01)

(52) U.S. Cl.
CPC ...... *A61M 25/0147* (2013.01); *A61M 25/005* (2013.01); *A61M 25/0158* (2013.01)

(58) Field of Classification Search
CPC ............ A61M 25/005; A61M 25/0012; A61M 25/0147; A61M 25/0158; A61B 5/24;
(Continued)

(56) References Cited

U.S. PATENT DOCUMENTS 4,484,586 A * 11/1984 McMickle ............ A61L 29/085
264/165
4,559,951 A * 12/1985 Dahl ...................... A61N 1/056
600/374
(Continued)

FOREIGN PATENT DOCUMENTS

EP          0647435 A1    4/1995
JP      2011204986 A    10/2011
(Continued)

OTHER PUBLICATIONS

Grilamid Polyamide 12 Technical Polymer for highest demands, www.emsgrivory.com/fileadmin/ems-grivory/documents/brochures/3001_en_Grilamid-L-PA12.pdf (40 pp)(accessed May 22, 2023) (Year: 2017).*

(Continued)

*Primary Examiner* — Bhisma Mehta
*Assistant Examiner* — Adam J. Cermak
(74) *Attorney, Agent, or Firm* — Wiley Rein LLP

(57) ABSTRACT

A steerable sheath includes an inner liner extending from a proximal to a distal end of the steerable sheath. The inner liner includes a non-deflectable portion and a deflectable portion. The steerable sheath includes a first pull wire positioned along a first helical path around the circumference of the inner liner from a proximal to a distal end of the non-deflectable portion and along a first straight path from a proximal to a distal end of the deflectable portion. The steerable sheath includes a second pull wire positioned along a second helical path around the circumference of the inner liner from the proximal to the distal end of the non-deflectable portion and along a second straight path from the proximal to the distal end of the deflectable portion. The steerable sheath may also include electrode wires present in (Continued)

a helical or spiral pattern around the circumference of the steerable sheath.

14 Claims, 10 Drawing Sheets

(58) Field of Classification Search
CPC ............. A61B 5/287; A61B 5/6855; A61B 2017/00526; A61B 2018/00351; A61B 18/1492; A61N 1/056; A61N 1/0551
See application file for complete search history.

(56) References Cited

U.S. PATENT DOCUMENTS

| | | | | |
|---|---|---|---|---|
| 5,330,520 | A * | 7/1994 | Maddison | A61N 1/056 607/122 |
| 5,417,208 | A * | 5/1995 | Winkler | A61N 1/056 607/116 |
| 5,824,026 | A * | 10/1998 | Diaz | A61N 1/056 607/116 |
| 5,836,946 | A * | 11/1998 | Diaz | A61B 18/1492 606/45 |
| 6,078,830 | A * | 6/2000 | Levin | A61B 18/1492 606/41 |
| 6,245,068 | B1 * | 6/2001 | Olson | A61L 31/10 606/41 |
| 7,047,082 | B1 * | 5/2006 | Schrom | A61N 1/0551 607/116 |
| 7,555,349 | B2 * | 6/2009 | Wessman | A61N 1/0551 607/116 |
| 7,571,010 | B2 * | 8/2009 | Zarembo | A61N 1/056 607/148 |
| 7,831,311 | B2 * | 11/2010 | Cross, Jr. | A61N 1/056 607/116 |
| 8,431,057 | B2 * | 4/2013 | Guo | B29C 61/006 264/209.1 |
| 8,620,399 | B2 * | 12/2013 | Gonda | A61B 18/1492 600/509 |
| 8,647,323 | B2 * | 2/2014 | Guo | A61M 25/0043 604/527 |
| 8,756,806 | B2 * | 6/2014 | O'Dea | A61M 25/1027 156/60 |
| 8,842,953 | B2 * | 9/2014 | Mihajlovic | A61B 18/24 607/15 |
| 9,242,088 | B2 * | 1/2016 | Thakkar | A61B 5/0245 |
| 9,295,833 | B2 * | 3/2016 | Nilsson | A61N 1/36564 |
| 9,427,551 | B2 * | 8/2016 | Leeflang | A61M 25/0032 |
| 9,844,661 | B2 * | 12/2017 | Franz | A61N 1/0551 |
| 9,925,354 | B2 * | 3/2018 | Scott | A61B 5/24 |
| 10,582,869 | B2 * | 3/2020 | Govari | A61B 5/6852 |
| 10,849,684 | B2 * | 12/2020 | Ogle | A61B 18/1492 |
| 2004/0162600 | A1 * | 8/2004 | Williams | A61N 1/05 607/122 |
| 2006/0074442 | A1 | 4/2006 | Noriega et al. | |
| 2006/0111768 | A1 | 5/2006 | Wessman et al. | |
| 2007/0270679 | A1 * | 11/2007 | Nguyen | A61M 25/0043 600/585 |
| 2008/0243218 | A1 * | 10/2008 | Bottomley | A61N 1/05 324/318 |
| 2011/0196464 | A1 * | 8/2011 | Pinchuk | A61N 1/056 607/122 |
| 2012/0130218 | A1 | 5/2012 | Kauphusman et al. | |
| 2013/0310823 | A1 * | 11/2013 | Gelfand | A61M 25/0082 606/41 |
| 2013/0338467 | A1 * | 12/2013 | Grasse | A61B 18/1492 606/41 |
| 2014/0350551 | A1 * | 11/2014 | Raatikka | A61B 18/1492 606/41 |
| 2014/0358140 | A1 * | 12/2014 | Emmons | A61B 18/1815 606/33 |
| 2015/0119859 | A1 * | 4/2015 | Cajamarca | A61M 25/005 604/526 |
| 2015/0273181 | A1 * | 10/2015 | Leeflang | A61M 25/005 606/41 |
| 2016/0081744 | A1 * | 3/2016 | Wang | A61B 5/4893 606/41 |
| 2016/0113710 | A1 * | 4/2016 | Ogle | A61M 25/0012 606/41 |
| 2016/0158490 | A1 * | 6/2016 | Leeflang | A61M 25/0012 29/882 |
| 2016/0276739 | A1 * | 9/2016 | Buesseler | A61B 34/20 |
| 2016/0324474 | A1 * | 11/2016 | Sterrett | C25D 5/56 |
| 2017/0100187 | A1 * | 4/2017 | Basu | A61B 18/1492 |
| 2017/0106170 | A1 * | 4/2017 | Hsueh | A61M 25/0147 |
| 2018/0132754 | A1 * | 5/2018 | Kusumoto | A61B 5/287 |
| 2018/0280104 | A1 * | 10/2018 | Farah | A61N 1/0534 |
| 2018/0325592 | A1 * | 11/2018 | Emmons | A61N 7/022 |
| 2019/0381274 | A1 * | 12/2019 | Olson | A61M 25/003 |
| 2020/0253730 | A1 * | 8/2020 | Sheps | A61F 2/2427 |

FOREIGN PATENT DOCUMENTS

| | | | | |
|---|---|---|---|---|
| WO | WO-8002231 | A1 * | 10/1980 | ............. A61N 1/056 |
| WO | 2014194368 | A1 | 12/2014 | |

OTHER PUBLICATIONS

Rilsan Besno Med TDS (2 pp), https://mypolymer.materialdatacenter.com/pds/en/si/rilsanbesnomed (accessed May 22, 2023) (Year: 2023).*
International Search Report and Written Opinion for International Application No. PCT/US2018/050850, mailed Dec. 19, 2018, 12 pages.

* cited by examiner

TORQUEABLE STEERABLE SHEATHS

CROSS-REFERENCE TO RELATED APPLICATIONS

This application is the national stage entry of PCT/US2018/050850, filed Sep. 13, 2018, which claims the benefit of priority to U.S. Provisional Patent Application No. 62/558,688, filed Sep. 14, 2017, the entire contents of which are hereby incorporated by reference herein in their entirety.

BACKGROUND OF THE DISCLOSURE

Field of the Disclosure

The present disclosure relates to steerable introducers and methods of making and using steerable introducers. More particularly, the present invention relates to the torqueable steerable sheaths for steerable introducers and methods of making and using such sheaths.

Background Art

Steerable introducers are often used for the delivery of medical devices, such as catheters, to a target site. Typically, the sheath of the steerable introducer is manipulated through the patient's vasculature and to the intended site, for example, a site within the patient's heart or other organ, with a medical device, such as a catheter, within a lumen of the sheath. The medical device, or a portion thereof, is advanced out of the sheath for use at the target site.

Steerable sheaths for steerable introducers are typically steered by use of pull wires embedded in the sheath on opposite sides of the sheath. In some known sheaths, the pull wires extend parallel to each other in a straight line from a proximal end of the sheath near the handle of the steerable introducer to a distal end of the sheath. The pull wires are fixedly coupled to the sheath at the distal end of the sheath. Pulling one of the pull wires toward the proximal end of the sheath shortens that pull wire causing a deflectable portion of the distal end of the sheath to deflect in the direction of the shortened wire.

SUMMARY OF THE DISCLOSURE

The present disclosure is directed to a steerable sheath having a proximal end and a distal end. The steerable sheath includes an inner liner having an outer circumference and extending from the proximal end to the distal end of the steerable sheath. The inner liner includes a non-deflectable portion having a proximal end and a distal end, the non-deflectable portion extending from the proximal end of the steerable sheath toward the distal end of the steerable sheath. The inner liner also includes a deflectable portion extending the proximal end adjacent the distal end of the non-deflectable portion to a distal end at the distal end of the steerable sheath. The steerable sheath includes a first pull wire positioned along a first helical path around the circumference of the inner liner from the proximal end to the distal end of the non-deflectable portion of the inner liner and along a first straight path from the proximal end of the deflectable portion to the distal end of the deflectable portion. The steerable sheath includes a second pull wire positioned along a second helical path around the circumference of the inner liner from the proximal end to the distal end of the non-deflectable portion and along a second straight path from the proximal end of the deflectable portion to the distal end of the deflectable portion.

The present disclosure is also directed to a steerable introducer including a handle assembly and a steerable sheath. The steerable sheath is operatively coupled to the handle assembly. The steerable sheath has a proximal end, a distal end, a non-deflectable portion adjacent the proximal end of the steerable sheath, a deflectable portion adjacent the distal end of the steerable sheath, a first pull wire extending from the proximal end to the distal end of the steerable sheath, and a second pull wire extending from the proximal end to the distal end of the steerable sheath. The first pull wire is positioned along a first helical path through the non-deflectable portion of the steerable sheath, and along a first straight path through the deflectable portion of the steerable sheath. The second pull wire is positioned along a second helical path through the non-deflectable portion of the steerable sheath, and along a second straight path through the deflectable portion of the steerable sheath.

The present disclosure is further directed to a method of producing a steerable sheath. The method includes positioning first pull wire along a first helical path around a circumference of a non-deflectable portion of an inner liner from a proximal end of the non-deflectable portion of the inner liner to a distal end of the non-deflectable portion of the inner liner and positioning first pull wire along a first straight path from a proximal end of a deflectable portion of the inner liner to a distal end of the deflectable portion, wherein the proximal end of the deflectable portion of the inner liner is adjacent the distal end of the non-deflectable portion of the inner liner. The method further includes positioning a second pull wire along a second helical path around the circumference of the non-deflectable portion of the inner liner from the proximal end of the non-deflectable portion of the inner liner to the distal end of the non-deflectable portion of the inner liner and positioning the second pull wire along a second straight path from the proximal end of the deflectable portion of the inner liner to the distal end of the deflectable portion of the inner liner.

The present disclosure is further directed to a steerable sheath having a proximal end and a distal end. The steerable sheath comprises: (i) an inner liner extending from a proximal end of a non-deflectable portion of the steerable sheath to a distal end of a deflectable portion of the steerable sheath; (ii) a torque transfer layer surrounding the inner liner and extending from the proximal end of the non-deflectable portion of the steerable sheath to the distal end of the deflectable portion of the steerable sheath; (iii) a first reflowed polymeric layer having and outer circumference and surrounding the torque transfer layer, the first reflowed polymeric material extending from the proximal end of the non-deflectable portion of the steerable sheath to the distal end of the deflectable portion of the steerable sheath; and (iv) a first electrode wire positioned along a first helical path around the outer circumference of the first reflowed polymeric layer from the proximal end to a distal end of the non-deflectable portion and positioned along a second helical path around the outer circumference of the first reflowed polymeric layer from a proximal end of the deflectable portion to the distal end of the deflectable portion. The first electrode wire is electrically connected to a first electrode positioned on the deflectable portion.

The present disclosure is further directed to a steerable sheath having a proximal end and a distal end. The steerable sheath comprises: (i) an inner liner extending from a proximal end of a non-deflectable portion of the steerable sheath to a distal end of a deflectable portion of the steerable sheath; (ii) a torque transfer layer having an outer circumference and surrounding the inner liner and extending from the proximal end of the non-deflectable portion of the steerable sheath to the distal end of the deflectable portion of the steerable sheath; (iii) a first electrode wire positioned along a first helical path around the outer circumference of the torque transfer layer from the proximal end to a distal end of the non-deflectable portion and positioned along a second helical path around the outer circumference of the torque transfer layer from a proximal end of the deflectable portion to the distal end of the deflectable portion; wherein the first electrode wire is electrically connected to a first electrode positioned on the deflectable portion; and (iv) a reflowed polymeric layer surrounding the first electrode wire and first electrode, wherein a portion of the reflowed polymeric layer has been removed to reveal at least a portion of the first electrode.

The present disclosure is further directed to a method of producing a steerable sheath. The method comprises: (i) positioning first pull wire along a first helical path around a circumference of a non-deflectable portion of an inner liner from a proximal end of the non-deflectable portion of the inner liner to a distal end of the non-deflectable portion of the inner liner; (ii) positioning the first pull wire along a first straight path from a proximal end of a deflectable portion of the inner liner to a distal end of the deflectable portion, wherein the proximal end of the deflectable portion of the inner liner is adjacent the distal end of the non-deflectable portion of the inner liner; (iii) positioning a second pull wire along a second helical path around the circumference of the non-deflectable portion of the inner liner from the proximal end of the non-deflectable portion of the inner liner to the distal end of the non-deflectable portion of the inner liner; (iv) positioning the second pull wire along a second straight path from the proximal end of the deflectable portion of the inner liner to the distal end of the deflectable portion of the inner liner; (v) positioning a torque transfer layer over the first pull wire, the second pull wire, and the inner liner; (vi) reflowing a first polymeric material over the torque transfer layer; (vii) positioning a first electrode wire along a third helical path around a circumference of the first reflowed polymeric material from a proximal end of a non-deflectable portion of the first reflowed polymeric material to a distal end of the non-deflectable portion of the first reflowed polymeric material and along a fourth helical path around a circumference of the first reflowed polymeric material from a proximal end of the deflectable portion of the first reflowed polymeric material to a distal end of the deflectable portion of the first reflowed polymeric material; and (viii) positioning a second electrode wire along a fifth helical path around the circumference of the first reflowed polymeric material from the proximal end of the non-deflectable portion of the first reflowed polymeric material to the distal end of the non-deflectable portion of the first reflowed polymeric material and along a sixth helical path around the circumference of the first reflowed polymeric material from the proximal end of the deflectable portion of the first reflowed polymeric material to the distal end of the deflectable portion of the first reflowed polymeric material.

The foregoing and other aspects, features, details, utilities, and advantages of the present disclosure will be apparent from reading the following description and claims, and from reviewing the accompanying drawings.

DETAILED DESCRIPTION OF THE DISCLOSURE

Figure 1:
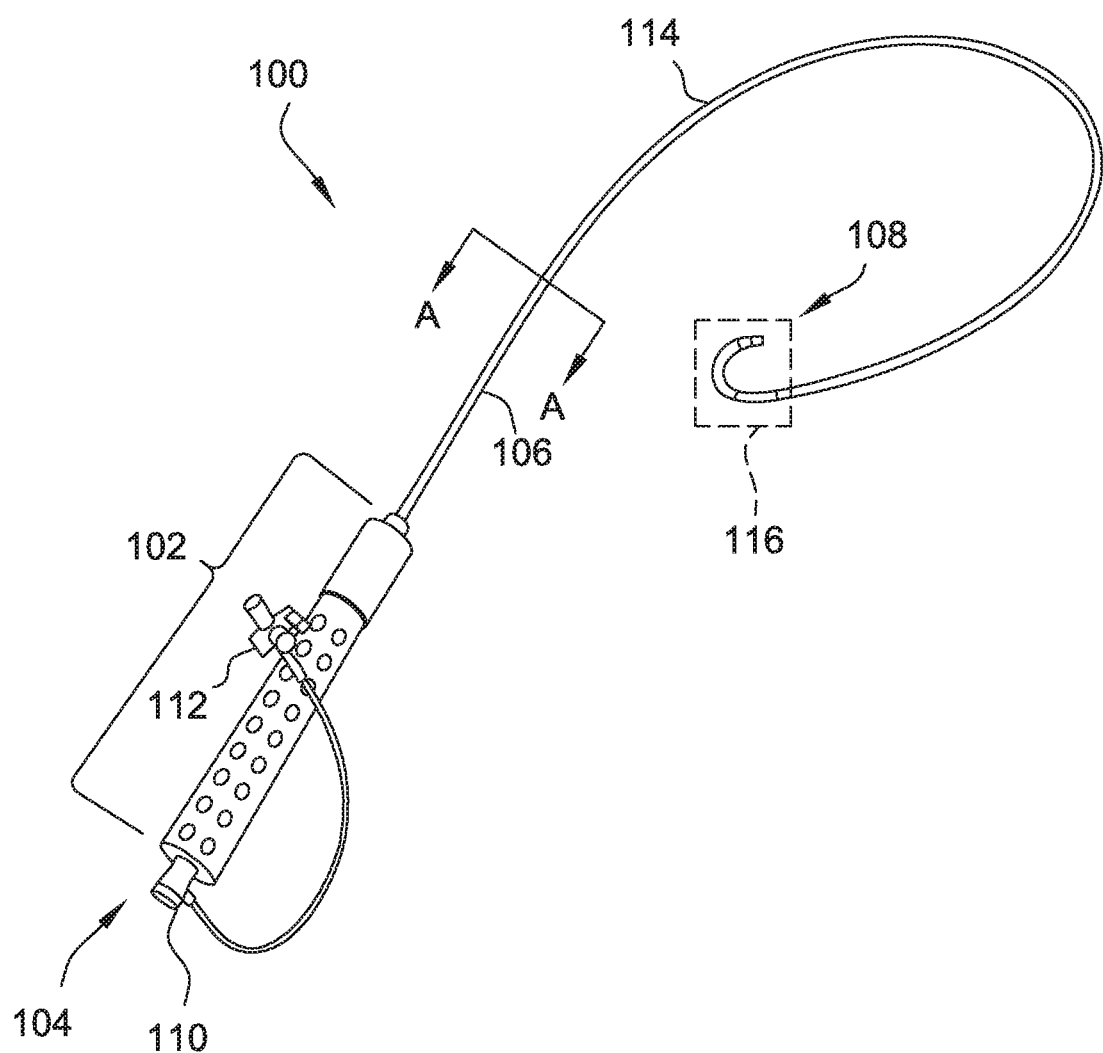
FIG. 1 is a perspective view of one embodiment of a steerable introducer.

Steerable introducers may include pull wires extending along a length of the introducer's steerable sheath from a proximal end of the sheath to a distal end of the sheath. As used herein, "proximal" refers to a direction toward the end of the introducer or sheath near the clinician and "distal" refers to a direction away from the clinician and (generally) inside the body of a patient. The pull wires are positioned on opposite sides of the steerable sheath and each runs in a generally straight line from the proximal end to the distal end of the steerable sheath. In use, one of the pull wires is shortened (e.g., pulled toward the proximal end of the steerable introducer) to place it under tension to cause a deflectable portion at the distal end of the steerable sheath to deflect in the direction of the tensioned pull wire. If the operator applies a torque to the introducer to cause the sheath to rotate along its central axis when one of the pull wires is under tension, the pull wires are rotated around the deflected portion of the sheath. The pull wire that is not under tension will need to shorten as it is rotated from an outside of the deflected portion (e.g., from an outer radius of a curve) to an inside of the deflected portion (e.g., to an inner radius of the curve) or the deflected portion of the sheath will change its deflection. Similarly, the tensioned pull wire needs to lengthen as it is rotated by the torque from the inside of the deflected portion to the outside of the deflected portion to maintain the same deflection of the sheath. During such an application of torque to the steerable introducer, energy is stored in the pull wires as the rotation of the sheath attempts to force them to change their lengths. This stored energy may release suddenly, causing the distal end of the steerable shear to make a sudden, fast, and unpredictable movement, sometimes referred to as whipping. At other times, the stored energy may cause one or both of the pull wires to break, typically at their anchor points within the handle of the steerable introducer.

Accordingly, the present disclosure is directed to a steerable sheath including pull wires configured to permit the application of torque to the introducer with the steerable sheath in a deflected position while reducing the likelihood of breaking the pull wires and/or whipping of the distal end of the steerable sheath. Additionally, the present disclosure is directed to a steerable sheath including one or more electrodes including electrode wires configured to provide a strain relief to compression or flexing of the sheath shaft.

The electrode wires may be wrapped around the circumference of the steerable sheath (helical or spiral path) with different winding patterns (tighter in some areas and looser in other areas) present in different areas of the steerable sheath to provide the intended benefits as described herein. In combination with the winding patterns described herein, the steerable sheaths may include one or multiple reflowed polymeric layers to improve the overall performance of the steerable sheath.

The systems and methods described herein provide a steerable sheath having pull wires and/or electrode wires that are wrapped around the circumference of the steerable sheath as they extend along the length of a non-deflectable portion of the steerable sheath. Rather than extending in a straight line from proximal end to distal end of the steerable sheath, the pull wires and electrode wires are disposed in a non-overlapping, helical pattern from the proximal end of the sheath to the distal end of the non-deflectable section of the sheath. In the deflectable section of the sheath, the pull wires are disposed in straight lines on opposite sides of the sheath from the proximal end of the deflectable section to the distal end of the deflectable section. The rotation of the pull wires along the length of the non-deflectable section reduces the energy stored in the pull wires when torque is applied to the steerable introducer while the deflectable section is in a deflected position. This allows a smooth, approximately one-to-one response of the steerable introducer to an applied torque without breaking the pull wires or whipping the distal end of the sheath.

Although described herein with respect to a steerable sheath as part of a steerable introducer, the teachings of the present disclosure may be applied to other steerable shafts, and particularly to other steerable medical devices. For example, the pull wire arrangements described herein may be applied to steerable catheters and intracardiac echocardiography catheters.

Referring now to the Figures, FIG. 1 is a perspective view of a steerable introducer 100 according to one embodiment. Introducer 100 includes a handle assembly 102 at a proximal end 104 and a steerable sheath 106 extending to a distal end 108 of steerable introducer 100. Steerable sheath 106 is operably coupled to handle assembly 102, which assists in guiding or steering steerable sheath 106 during procedures. Introducer assembly 100 further includes a hub 110 operably connected to an inner lumen (not shown) within handle assembly 102 for insertion or delivery of catheter assemblies, fluids, or any other devices known to those of ordinary skill in the art. Optionally, introducer assembly 100 further includes a valve 112 operably connected to hub 110. Steerable sheath 106 includes a flexible, non-deflectable portion 114 and a deflectable portion 116. Non-deflectable portion 114 extends from handle assembly 102 to deflectable portion 116. Deflectable portion 116 is configured to be controllably deflectable by an operator of introducer 100 using pull wires (not shown in FIG. 1) extending through steerable sheath 106 from deflectable portion 116 to handle assembly 102. Components within sheath 106 (discussed below) in non-deflectable portion 114 and deflectable portion 116 may also be referred to as having corresponding non-deflectable and/or deflectable portions. Additional details of the construction and operation of a handle suitable for use as handle assembly 102 are described in U.S. Pat. No. 7,691,095, which is incorporated herein by reference in its entirety. In other embodiments, any other handle suitable for operating steerable sheath 106 may be used as handle assembly 102.

Figure 2:
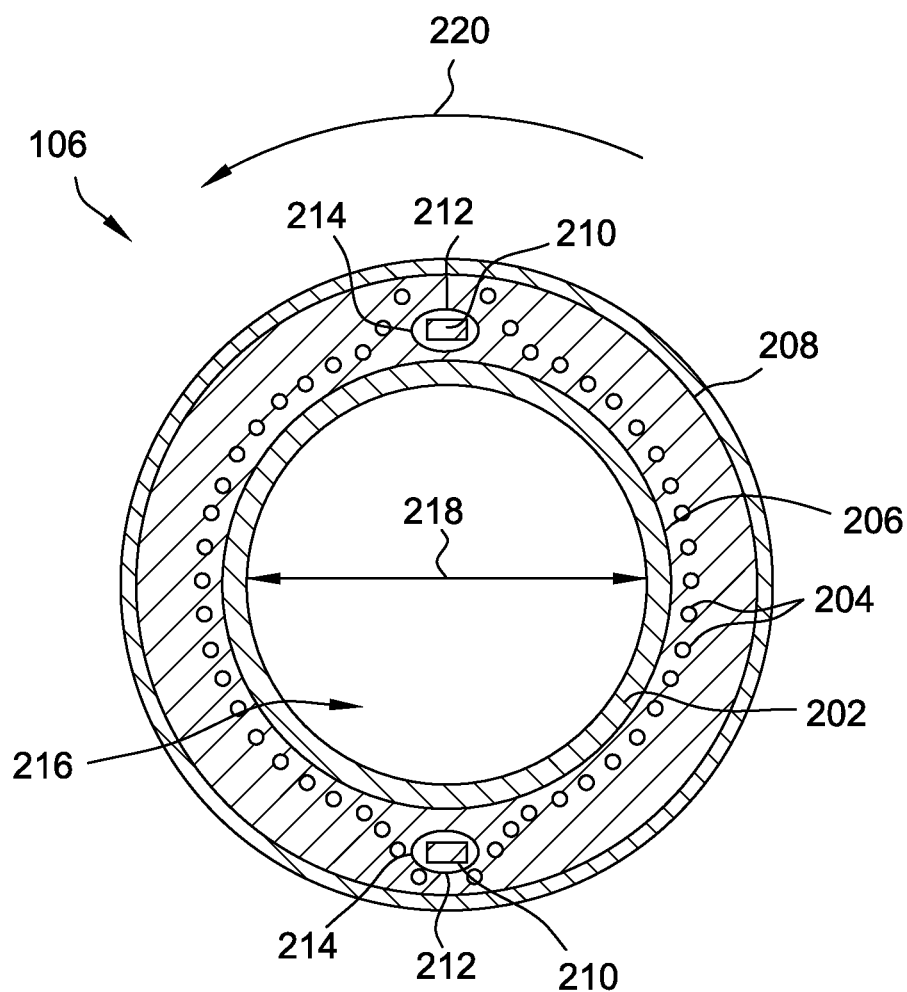
FIG. 2 is a cross section of a steerable sheath of the assembly shown in FIG. 1.

FIG. 2 is a cross-sectional view of steerable sheath 106 taken along the line A-A shown in FIG. 1. Steerable sheath 106 is comprised of a tubular inner liner 202 (also sometimes referred to as an "inner jacket"), a torque transfer layer 204, an outer sheath 206, a heat shrink layer 208 and pull wires 210. In other embodiments, the components of steerable sheath 106 may have different positions relative to each other component. For example, torque transfer layer 204 may be positioned radially inward of pull wires 210. In some embodiments, pull wires 210 are positioned directly adjacent inner liner 202. Heat shrink layer 208 is removed from steerable sheath 106 after the reflow process.

Steerable sheath 106 is manufactured using a reflow bonding process. Reflow bonding processes suitable for forming steerable sheath 106 are described in U.S. Pat. Nos. 7,914,515 and 8,734,699, which are incorporated herein by reference in their entireties. In other embodiments, any other suitable method for manufacturing steerable sheath 106 may be used.

In the example embodiment, pull wires 210 are flat wires. For purposes of this disclosure, a "flat wire" refers to a wire that is characterized by a cross-section that, when measured along two orthogonal axes, is substantially flat. A flat wire typically has a rectangular cross section, though the cross section need not be perfectly rectangular. For example, the present disclosure contemplates that a cross section of the flat wire may be oval, provided that the overall cross section is generally flat. As the term is used herein, a wire may be properly characterized as a flat wire if it has a cross section that is measured x in one direction and at least 2× in a second direction generally orthogonal to the first direction. A wire whose cross section is substantially I-shaped may also be a flat wire if, generally, its height is substantially greater than its width at its widest measurement. In other embodiments, pull wires 210 are round wires or wires of any other shape suitable for use as described herein.

Pull wire 210 is preferably about 0.002" by about 0.016", and more preferably about 0.004" by about 0.012" or 0.016". Pull wire 210 may be selected such that the ratio of the width to thickness is at least about 2:1.

In the example embodiment, pull wires 210 are stainless steel wires. In other embodiments, pull wires 210 may be made of any other suitable material, such as spring steel, Nitinol (nickel titanium alloy), or a nickel-cobalt base alloy. A suitable nickel-cobalt base alloy includes MP35N®, which is a registered trademark of SPS Technologies. Inc., of Jenkintown, PA, USA.

In the example embodiment, pull wires 210 are encased inside another polymeric tubular member 212 forming a lumen 214 for housing the pull wire 210. Polymeric tubular member 212 need not be the same shape as the cross section of pull wire 210, but instead, may be round, oval, rectangular, or another like shape. Preferably, the polymeric tubular member 212 has a cross section that is not the same shape as a cross section of pull wire 210, in order to facilitate movement of pull wire 210 in the preformed tube. Polymeric tubular member 212 may be formed of PTFE, etched PTFE, polyether block amides (such as Pebax), nylon, other thermoplastic elastomers, or any other known material to one of ordinary skill in the art. Preferably, the polymeric tubular member 212 has a higher melting point than outer sheath 206 so that polymeric tubular member 212 will not melt when steerable sheath 106 is subjected to reflow melt processing. In other embodiments lumen 214 is not formed using polymeric tubular member 212. Rather, pull wires 210 may be covered with lubricious materials (not shown) before placement, including silicone and other lubricious materials, and lumen 214 may be formed by the presence of pull wires 210 during the reflow process.

In the example embodiments, two pull wires 210 are used in steerable sheath 106. As described in more detail below, pull wires 210 rotate around a circumferential direction 220 of steerable sheath 106 as they extend along the non-deflectable section 114 of steerable sheath 106. At any point along steerable sheath 106, pull wires 210 remain spaced at about 180 degrees apart. Pull wires 210 extend in straight lines 180 degrees apart through deflectable portion 116 (shown in FIG. 1) without wrapping around sheath 106 in circumferential direction 220. This results in a steerable sheath 106 that can be deflected in two opposite directions by coordinated manipulation of the pull wires 210. In other embodiments, four pull wires located 90 degrees apart may be used to provide four directions of deflectability. In still other embodiments, any suitable number of pull wires may be used to provide a desired number of deflection directions for steerable sheath 106.

Pull wires 210 are connected to at least one steering ring (not shown) typically located near the distal end 108 (shown in FIG. 1) of steerable introducer 100. The proximal ends of pull wires 210 are operably connected to a steering mechanism (not shown) in handle 102 allowing for manipulation, or steering, of steerable sheath 106 during use. Additional details of the construction and operation of steering rings and steering mechanisms suitable for use in steerable introducer 100 are described in U.S. Patent Application Publication No. US2007/0299424, and U.S. Pat. Nos. 7,691,095, 7,914,515 and 8,734,699, each of which is incorporated herein by reference in its entirety.

Inner liner 202 is preferably a polymeric material, such as polytetrafluoroethylene (PTFE) or etched PTFE. Inner liner 202 may also be made of other melt processing polymers, including, without limitation, polyether block amides, nylon and other thermoplastic elastomers. Once such elastomer is Pebax® made by Arkema, Inc. Pebax of various durometers may also be used, including without limitation, Pebax 30D to Pebax 70D. In a preferred embodiment, inner liner 202 is made of a material with a melting temperature higher than outer sheath 206 such that inner liner 202 will withstand the melt processing of the outer sheath 206.

Inner liner 202 defines a lumen 216 therethrough for receiving an elongate medical device, such as a catheter. Lumen 216 preferably has a diameter 218 of at least about 6 French, more preferably of at least about 7 French, and most preferably of between about 10 French and about 24 French. However, in some embodiments, it is contemplated that lumen 216 may have a diameter 218 of up to about 32 French or more, such as between about 7 French and about 32 French.

Torque transfer layer 204 is disposed between the inner liner 202 and the heat shrink layer 208, and more preferably between the outer sheath 206 and the inner liner 202. The torque transfer layer 204 may be made of stainless steel (304 or 316) wire or other acceptable materials known to those of ordinary skill in the art. The torque transfer layer 204 is preferably formed of a braided wire assembly comprised of flat wires, preferably stainless steel wires including, for example, high tensile stainless steel wires. The torque transfer layer 204 may be formed in any number of known braid patterns, including one-over-one (involving at least two wires) or two-over-two (involving at least four wires) crossover patterns. For lumen diameters of at least about 6 French, braided flat wires of at least about 0.003" thick by at least about 0.007" wide may be used. In general, the individual wires have a ratio of width to the thickness of at least about 2:1, including, for example, 2:1 to 5:1. Flat wires of about 0.004" thick by about 0.012" wide and of about 0.004" thick by about 0.020" wide have also been braided with success to form torque transfer layers of superior performance.

Outer sheath 206 is preferably either an extruded Pebax or PTFE tubing. The melt-processing polymer of outer sheath 206 occupies a plurality of voids of the wire mesh in the torque transfer layer. Outer sheath 206 may also be made of other melt processing polymers, including, without limitation, etched PTFE, polyether block amides, nylon and other thermoplastic elastomers, at varying durometers. Outer sheath 206 may also comprise more than one layer, including, for example, two or more tubes of a melt processing polymer. Alternatively, outer sheath 206 may be comprised of varying segments (not shown) differing in hardness and/or material along the length of steerable sheath 106 and being reflow bonded together. Varying the sheath composition in this manner provides the additional benefit of adjusting flexibility, torqueability, and pushability at various points along steerable sheath 106.

Figure 3:
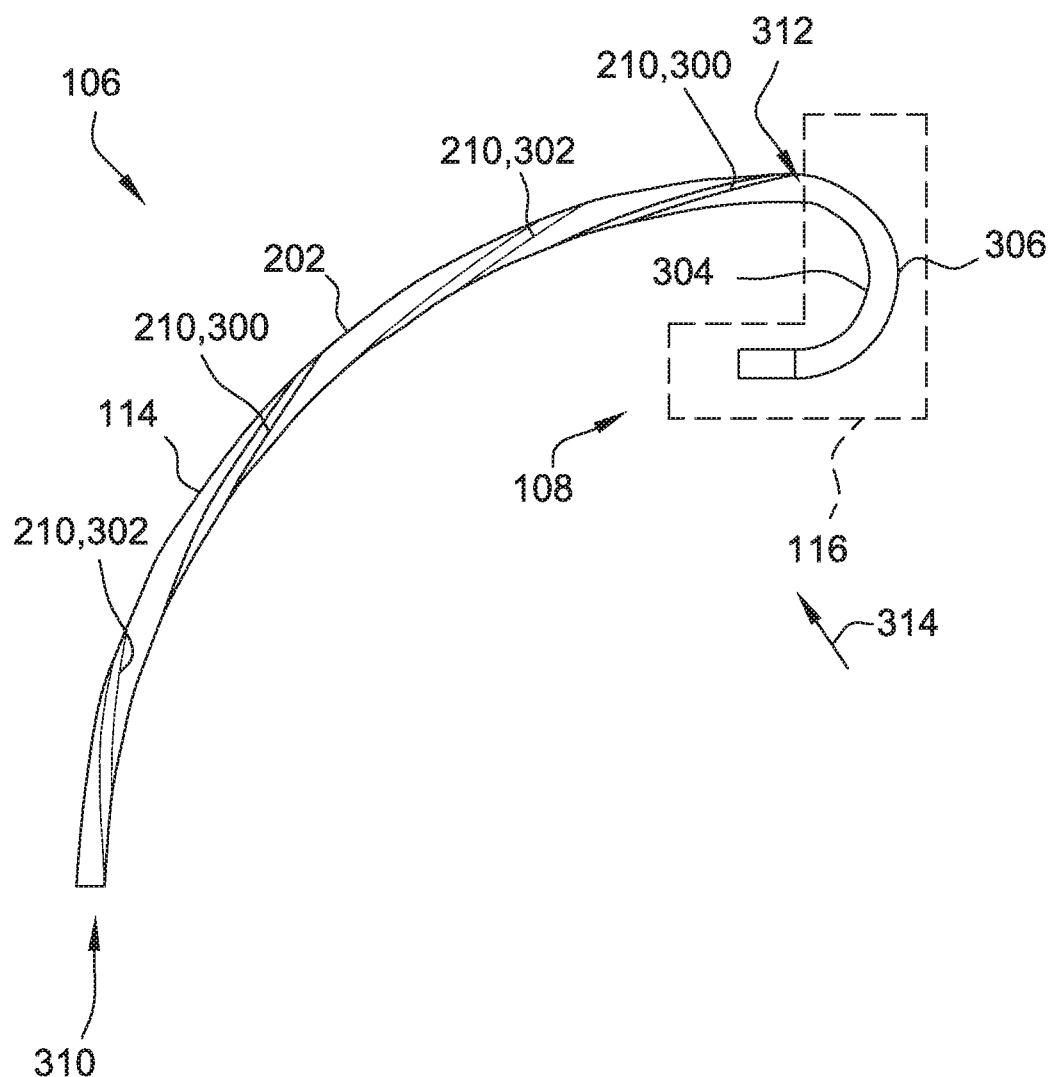
FIG. 3 is a side view of the steerable sheath shown in FIG. 1 with outer layers removed to show the sheath's embedded pull wires.
Figure 4:
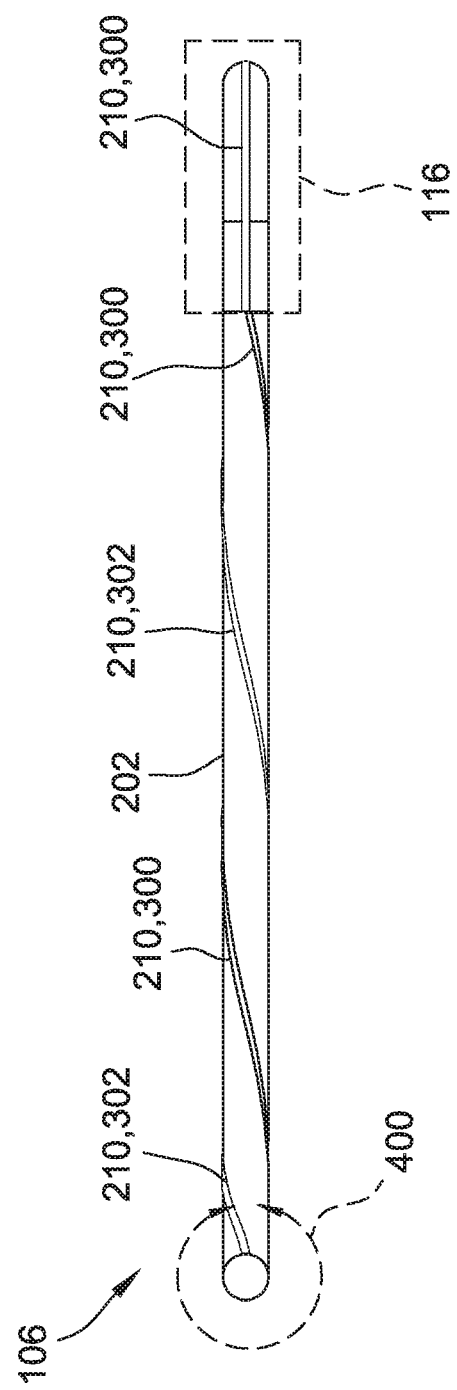
FIG. 4 is a top view of the steerable sheath as shown in FIG. 3.
Figure 5:
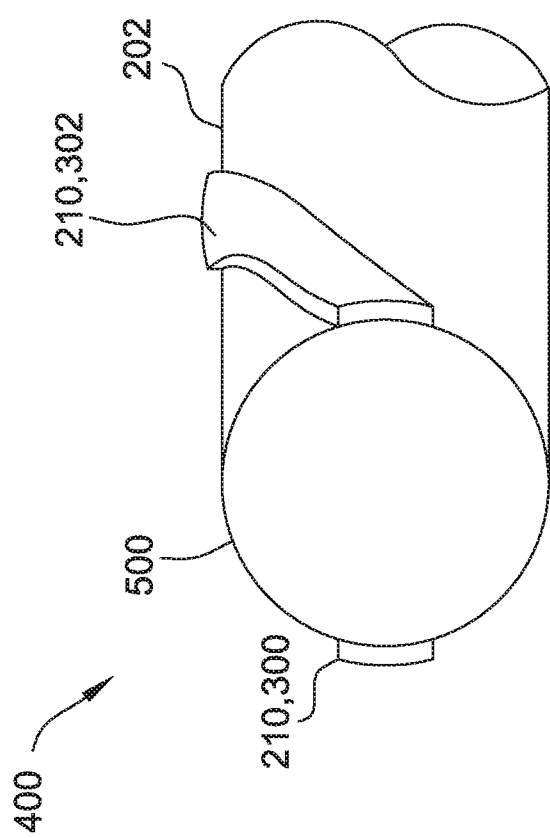
FIG. 5 is a perspective view of a section of the steerable sheath shown in FIG. 4.

FIGS. 3, 4, and 5, are various views of steerable sheath 106 with torque transfer layer 204, outer sheath 206, and heat shrink layer 208 removed. FIG. 3 is a side view of steerable sheath 106. FIG. 4 is a top view of steerable sheath 106 in the same configuration as seen from direction 314 shown in FIG. 3. FIG. 5 is an enlarged view of a section 400 of steerable sheath 106 shown in FIG. 4.

Pull wires 210 are separately identified in FIGS. 3, 4, and 5 as first pull wire 300 and second pull wire 302. As shown in FIG. 3, deflectable portion 116 is deflected to a U-shape having an inner radius 304 and an outer radius 306. Pull wires 210 extend from a proximal end 310 of steerable sheath 106 to distal end 108.

In non-deflectable portion 114, first pull wire 300 and second pull wire 302 wrap around inner liner 202. Inner liner 202 is a cylindrical tube having an outer circumference 500 (shown in FIG. 5). In non-deflectable portion 114, first pull wire 300 and second pull wire 302 traverse around circumference 500 of inner liner 202 as they extend from proximal end 310 toward distal end 108. Thus, in non-deflectable portion 114, each pull wire 210 follows a substantially helical path from proximal end 310 to distal end 108. First pull wire 300 and second pull wire 302 both wrap around inner liner 202 at a same rate (e.g., number of rotations per unit of length) and do not cross over each other. The helical path followed by first pull wire 300 is offset from the helical path followed by second pull wire by 180 degrees around the circumference 500 (i.e., in a circumferential direction) of inner liner 202. Thus, first pull wire 300 and second pull wire 302 remain substantially 180 degrees apart throughout non-deflectable portion 114.

In the example embodiment, first pull wire 300 and second pull wire 302 are each wrapped twice (i.e. 720 degrees or two revolutions) around inner liner 202 as they traverse non-deflectable portion 114 from proximal end 310 toward distal end 116. In other embodiments, pull wires may wrap around inner liner 202 a different number of times. As the number of revolutions about inner liner 202 increases, torqueability of steerable shaft 106 without whipping or breaking pull wires 210 generally increases. However, friction along wires 210 may also increase with increased revolutions, leading to greater force being necessary to deflect deflectable portion 116. Moreover, increasing the number of times wire 210 wraps about inner liner 202 increases the length of pull wires 210, thereby potentially increasing material costs. Preferably, each pull wire 210 makes between one and four revolutions around inner liner 202 in non-deflectable portion 114. In some embodiments, each pull wire 210 makes between one and three revolutions around inner liner 202 in non-deflectable portion 114. In some embodiments, each pull wire 210 makes between one and two revolutions around inner liner 202.

During assembly of steerable sheath 106, first pull wire 300 and second pull wire 302 may be bonded to inner liner 202 to hold them in place until the reflow process is performed. In embodiments that include polymeric tubular member 212 to form lumen 214, polymeric tubular member 212 may be bonded to inner liner 202.

In the example embodiment, first pull wire 300 and second pull wire 302 are wrapped around inner liner 202 in a counter-clockwise manner (as viewed from proximal end 310. In other embodiments, first pull wire 300 and second pull wire 302 wrap around inner liner 202 in a clockwise manner (as viewed from proximal end 310).

In deflectable portion 116, first pull wire 300 and second pull wire 302 do not wrap around inner liner 202. Rather, first pull wire 300 and second pull wire 302 each traverse a substantially straight path from a proximal end 312 of deflectable portion 116 to distal end 108. Although not visible in FIG. 3, first pull wire 300 continues from proximal end 312 of deflectable portion 116 to distal end 108 along outer radius 306. Similarly, second pull wire 302 continues from proximal end 312 of deflectable portion 116 to distal end 108 along inner radius 304. In FIG. 4, first pull wire 300 can be seen traversing a straight path along a portion of outer radius 306 in deflectable portion 116.

Although first pull wire 300 and second pull wire 302 are illustrated as ending at proximal end 310, it should be understood that first pull wire 300 and second pull wire 302 may extend beyond inner liner 202 in the proximal direction to permit access (such as by handle assembly 102, shown in FIG. 1) to first pull wire 300 and second pull wire 302 for operation of steerable sheath 106.

As noted above, the present disclosure is also directed to steerable sheaths that include one or more electrode wires that may be connected to one or more electrodes located primarily on the deflectable portion of the steerable sheath as discussed above (as noted below, in some embodiments one or more electrodes may be located in the non-deflectable portion of the steerable sheath). As described in more detail herein, in many embodiments of the present disclosure the steerable sheaths are manufactured to include a number of specific layers to improve the overall performance thereof. In some embodiments, the electrode wires present are wrapped around in inner layer (such as a polytetrafluoroethylene layer) and subsequently surrounded with a torque transfer layer and a polymeric layer. In other embodiments, the electrode wires are wrapped around a polymeric layer that covers both an inner layer and a torque transfer layer and then covered with a second polymeric material and optionally a third polymeric material. The polymeric materials may be coextruded polymers in some embodiments.

Additionally, the electrode wires present on the steerable sheaths may have a tighter wind or tighter pitch in the deflectable portion of the steerable sheath as compared to the non-deflectable portion of the steerable sheath where the wind or pitch of the electrode wires may be looser. This combination of a tighter wind or pitch in a certain region of the steerable catheter as compared to a looser wind or pitch in a separate region provides strain relief to compression or flexing of the steerable sheath during use. "Pitch" as used herein means the spacing between wire wraps on the steerable sheath; that is, a tight "pitch" is a closely spaced wire winding and a loose "pitch" is a widely spaced wire winding. Also, by embedding the electrode wires in the wall of the steerable sheath as described in the embodiments and Figures herein, there is provided additional security and protection to the electrode wires.

In one embodiment of the present disclosure, a steerable sheath includes an electrode wire having a tighter wind or pitch in the distal deflectable portion of the steerable shaft as compared to the proximal non-deflectable portion of the steerable shaft. The electrode wire is generally connected to an electrode. In many embodiments, this steerable shaft may also include one or more pull wires as described herein. In some desirable embodiments, a steerable sheath may include two pull wires and four electrode wires, with each electrode wire electrically connected to an electrode. In other embodiments, the tightly wound or pitched electrode wiring present in the deflectable portion of the steerable shaft may extend into a distal portion of the proximal non-deflectable portion of the steerable sheath and include an electrode in the non-deflectable portion. Embodiments described herein include electrodes in both the deflectable and non-deflectable portions of the steerable sheath.

Figure 6:
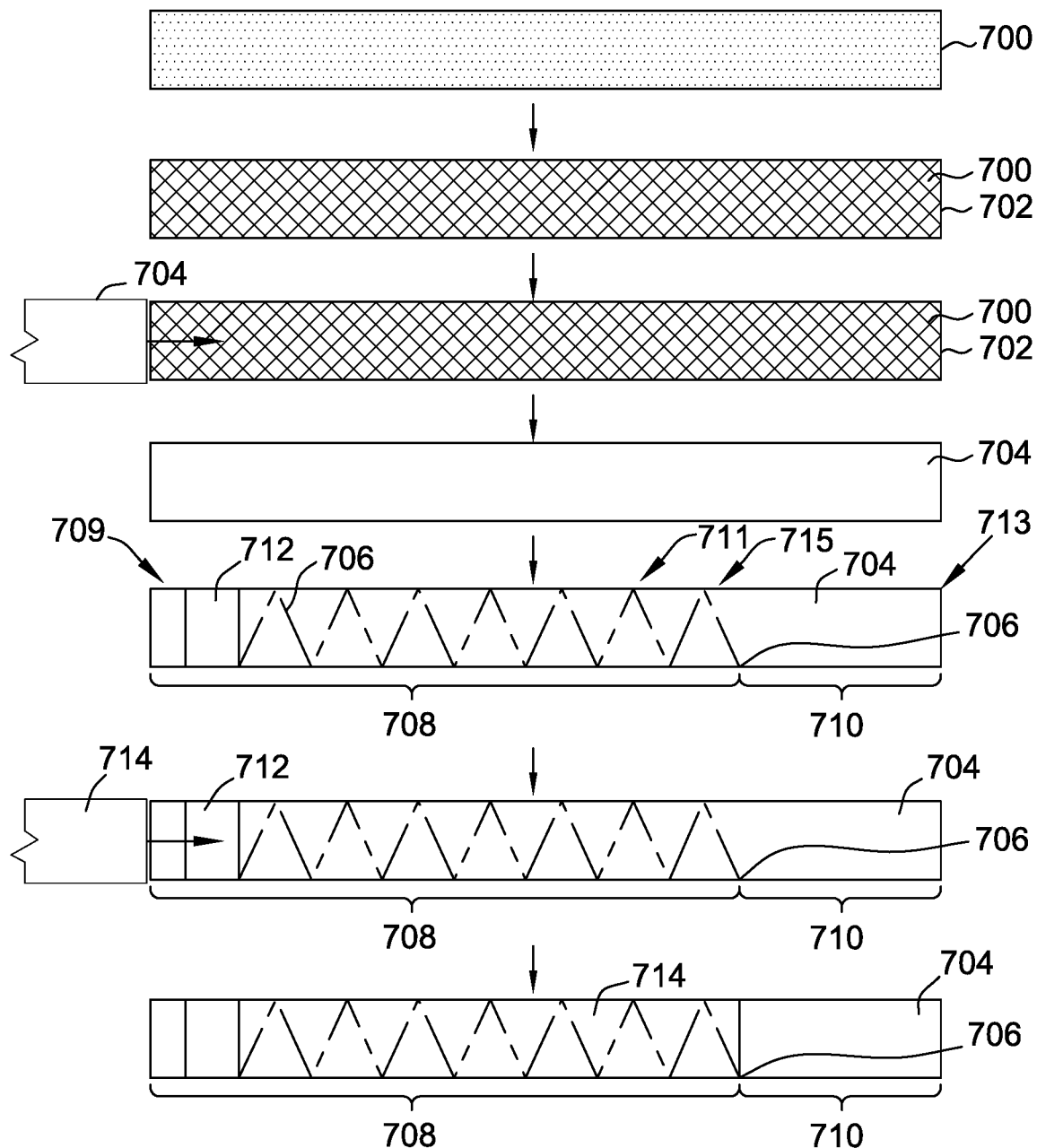
FIG. 6 shows a process for manufacturing a steerable sheath of the present disclosure.

Referring now to FIG. 6, there is shown a process for manufacturing a steerable sheath of the present disclosure. Inner liner 700, which may be formed from many suitable materials known in the art including polytetrafluoroethylene, for example, is covered with a torque transfer layer 702, such as a nitinol tube formed from a braided fabric. Once torque transfer layer 702 is in place, a polymeric material 704, or a combination of polymeric materials, is reflowed or otherwise applied to cover torque transfer layer 702 and inner liner 700. Suitable polymeric materials are described above, and include polymeric PEBAX® materials. Once polymeric material 704 is in place, an electrode wire 706 is wrapped around polymeric material 704 (although not illustrated in FIG. 6, it is within the scope of the present disclosure to have multiple electrode wires and electrodes). In the illustrated embodiment, electrode wire 706 has a first tight wind within a deflectable portion 708 and a looser wind within a non-deflectable portion 710. Deflectable portion 708 includes distal portion 709 and proximal portion 711. Non-deflectable portion 710 includes proximal portion 713 and distal portion 715. Although not illustrated in FIG. 6, it is within the scope of the present disclosure for the tightly wound portion of electrode wire 706 to extend partially within non-deflectable portion 710 (i.e., to extend within distal portion 715 of non-deflectable portion 710) and connect to an electrode positioned on non-deflectable portion 710. Electrode 712 is introduced onto polymeric material 704 within deflectable portion 710 and electrically connected to electrode wire 706. Following the introduction of electrode 712 onto polymeric material 704 a second polymer 714 or combination of polymers is reflowed over the tightly wound portion of electrode wire 706 located in deflectable portion 708. This second polymer 714 may be a single reflowed polymeric material, or may be a combination of two or more polymeric materials (co-extrusion), including, for example, a PEBAX® polymer and a Nylon 11 polymer that may or may not include one or more lubricious additives. Although not illustrated in FIG. 6, it is within the scope of the present disclosure for the steerable sheath to include one or more pull wires. After second polymer 714 has been reflowed, an optional third polymeric layer (not shown in FIG. 6) may be reflowed over electrode 712. The optional third polymeric reflowed layer may then be partially removed from electrode 712 to provide the desired amount of surface area on electrode 712. As such, in some embodiments of the present disclosure a suitable manufacturing process may include two reflowing of polymeric material steps, while other embodiments may include three reflowing of polymeric material steps.

Figure 7:
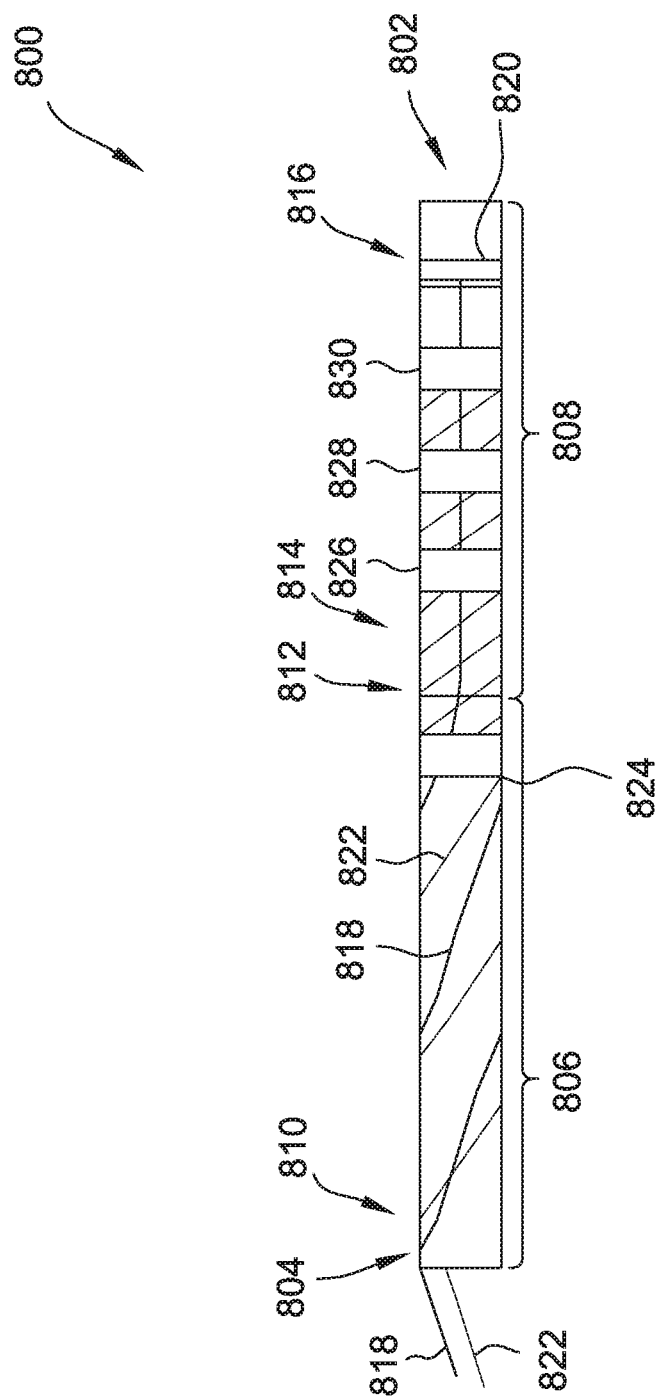
FIG. 7 is a side view of a steerable sheath of one embodiment of the present disclosure.

Referring now to FIG. 7, there is shown a sideview of a steerable sheath 800 of one embodiment of the present disclosure. Steerable sheath 800 includes distal end 802 and proximal end 804 and proximal non-deflectable portion 806 and distal deflectable portion 808. Non-deflectable portion 806 includes proximal portion 810 and distal portion 812 and deflectable portion 808 includes proximal portion 814 and distal portion 816. Steerable sheath 800 further includes pull wire 818 connected to pull ring 820. Pull wire 818 is in a helical formation within non-deflectable portion 806 and a straight formation within deflectable portion 808. Steerable sheath 800 further includes electrode wires 822 and electrodes 824, 826, 828, and 830 connected to electrode wires 822. Within non-deflectable portion 806, electrode wires 822 are primarily in a more loosely wound configuration as compared to electrode wires 822 located in deflectable portion 806 which are more tightly wound, although as illustrated electrode wires 822 near distal portion 812 of non-deflectable portion 806 does include tightly wound electrode wires 822. In this illustrated embodiment, one electrode 824 is located in distal portion 812 of non-deflectable portion 806 of steerable sheath 800.

As noted above, steerable sheaths of the present disclosure may include both pull wires and electrode wires (generally connected to electrodes). Steerable sheaths including both pull wires (having a desired helical configuration) and electrode wires (having a desired wind tightness) may be manufactured by first positioning two pull wires in an offset helical arrangement as described above around an inner liner (the pull wires may be in a tubular protective member as noted herein) and positioning a torque transfer layer over the inner liner and pull wires. The pull wires are generally connected to a pull ring located in a distal portion of the steerable sheath. A polymeric material is then reflowed over the torque transfer layer and pull wires. Next, electrode wires are introduced by positioning electrode wires around the reflowed polymeric material having the desired wind tightness or pitch. The wind tightness or pitch may of the electrode wires may be tighter in a deflectable portion of the steerable sheath as compared to a non-deflectable portion (although, in some embodiments as noted herein, the tight wind portion of the electrode wires may extend slightly into the distal portion of the non-deflectable portion). Electrodes are then introduced and connected to the electrode wires. A polymeric material is then introduced by reflowing a polymeric material over the electrode wires. In some embodiments, this polymeric material, which may be a single polymeric material or a co-extruded polymeric material including two or more components along with a lubricious additive, is reflowed over the electrode wires and a third polymeric material may optionally be reflowed over the electrodes. In this embodiment, a desired amount of this third reflowed polymeric material may be removed from the electrodes present to present a desired amount of electrode surface for a given application. In some embodiments, the reflowed polymeric material may be removed from the electrodes by laser ablation. Irrespective of the methodology utilized to remove the reflowed polymeric material from the electrodes, any suitable pattern may be present on the surface of the electrode including, for example, a square, circular, diamond, and the like pattern.

Figure 8A:
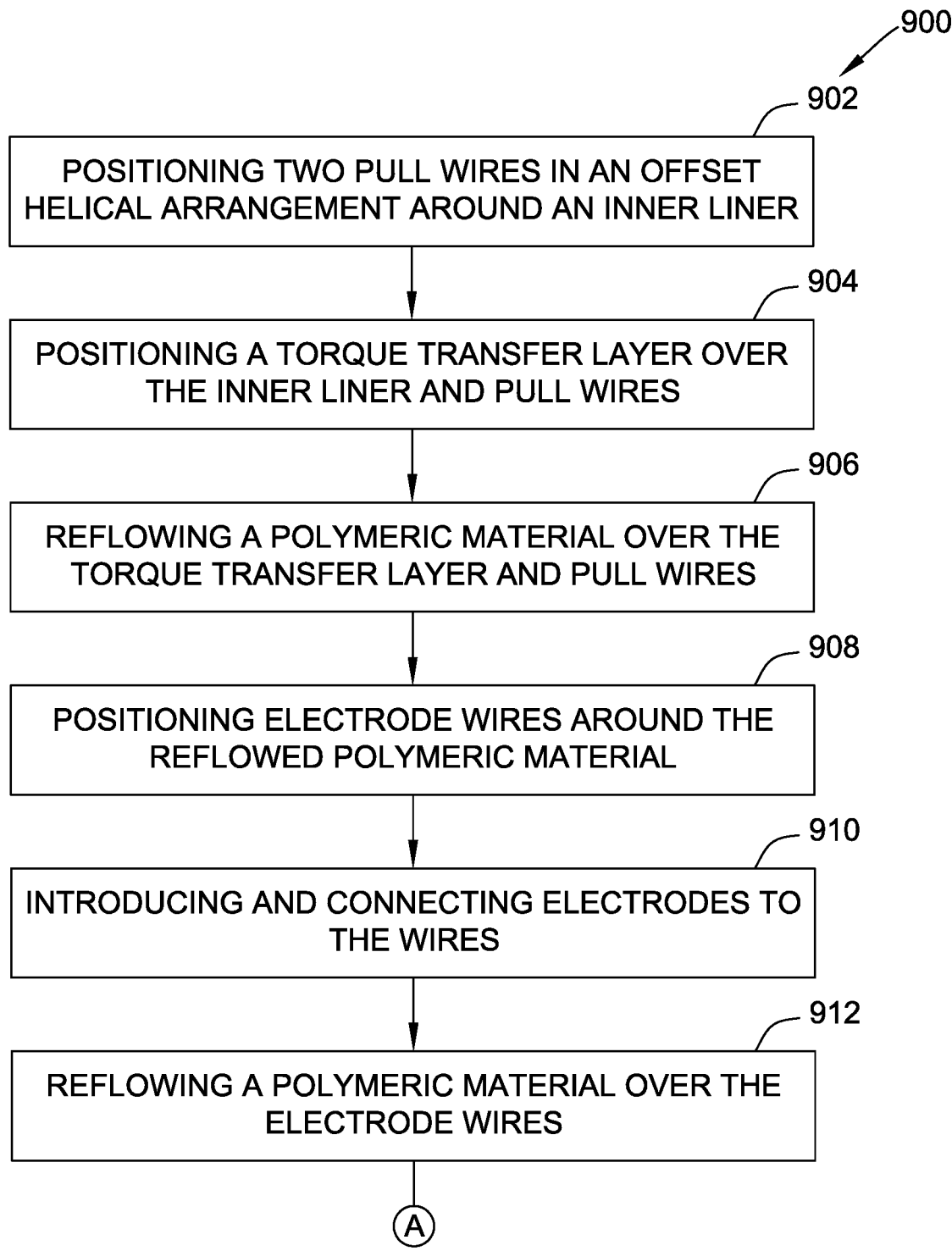
FIGS. 8A and FIG. 8B are a flow diagram of a method of manufacturing a steerable sheath according to one embodiment of the present disclosure.
Figure 8B:
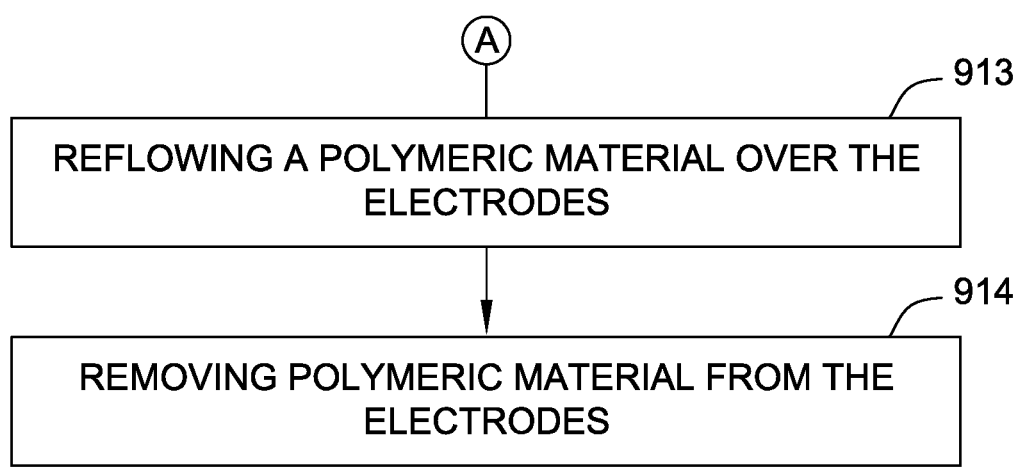

FIGS. 8A and 8B are a flow diagram of a method 900 of manufacturing a steerable sheath according to one embodiment of the present disclosure. Method 900 includes positioning 902 two pull wires in an offset helical arrangement around an inner liner and positioning 904 a torque transfer layer over the inner liner and pull wires. Method 900 further includes reflowing 906 a polymeric material over the torque transfer layer and pull wires and positioning 908 electrode wires around the reflowed polymeric material. Method 900 further includes introducing 910 and connecting electrodes to the electrode wires. Method 900 further includes reflowing 912 a polymeric material over the electrode wires. Method 900 further includes optionally reflowing 913 another polymeric material over the electrodes and removing 914 at least a portion of the polymeric material from the electrodes.

Figure 9:
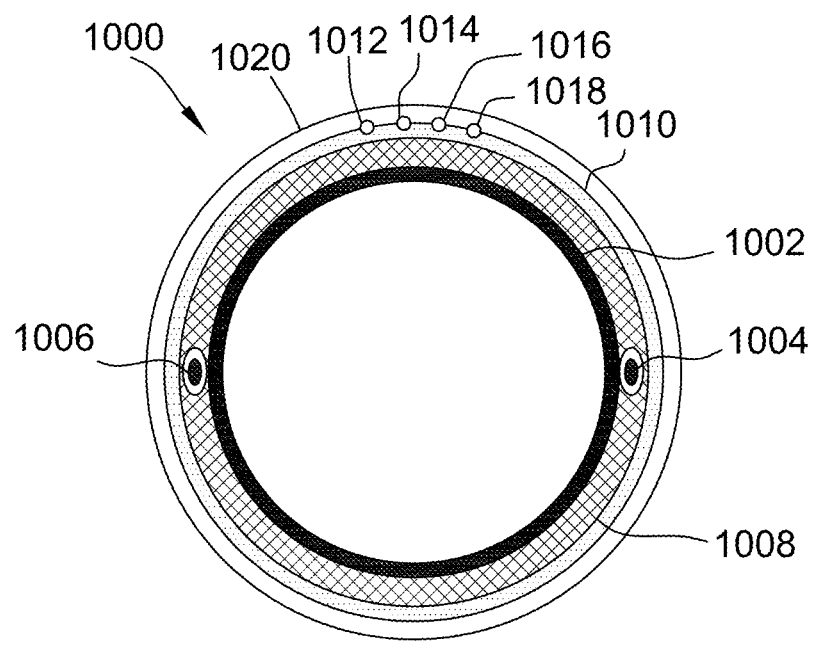
FIGS. 9 and 10 are cross sectional views of steerable sheaths in accordance with embodiments of the present disclosure.

Referring now to FIG. 9, there is shown a cross section of a steerable sheath 1000 prepared in accordance with one embodiment of the present disclosure. Steerable sheath 1000 includes inner liner 1002 having pull wires 1004 and 1006 disposed thereon. Torque transfer layer 1008 surrounds inner liner 1002 and pull wires 1004 and 1006. Steerable sheath 1000 further includes first reflowed polymeric layer 1010 that surrounds torque transfer layer 1008. Electrode wires 1012, 1014, 1016, and 1018 are located on top of (on an outer surface of) first reflowed polymeric layer 1010 and second reflowed polymeric layer 1020 surrounds first reflowed polymeric layer 1010 and electrode wires 1012, 1014, 1016, and 1018, which may be connected to 4 separate electrodes (not shown in FIG. 9). An optional reflowed polymeric material may cover a portion of one or more of the electrodes (not shown in FIG. 9). As shown in FIG. 9, electrode wires 1012, 1014, 1016, and 1018 are located at an interface between first reflowed polymeric layer 1010 and second reflowed polymeric layer 1020 (i.e., at a location where first reflowed polymeric layer 1010 meets second reflowed polymeric layer 1020).

Figure 10:
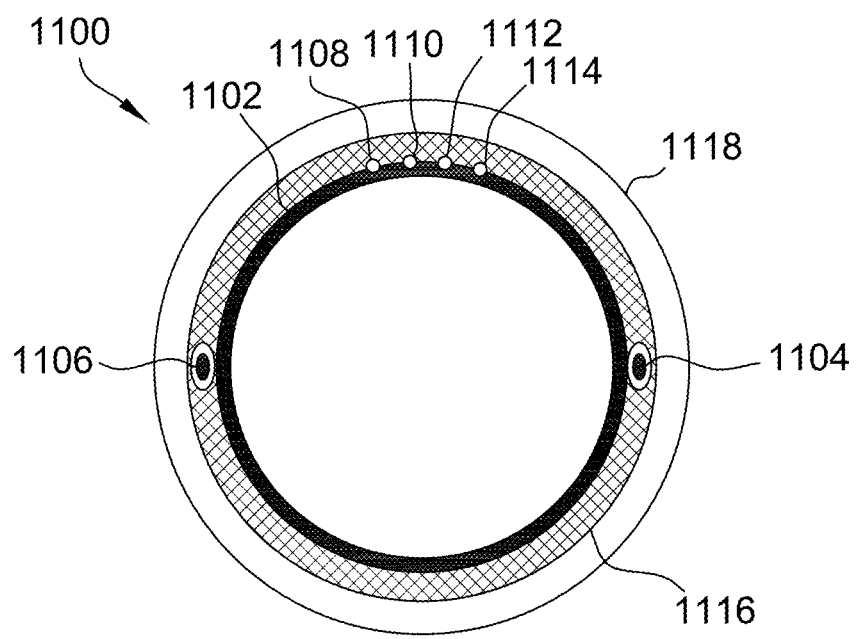

Referring now to FIG. 10, there is shown a cross section of a steerable sheath 1100 prepared in accordance with one embodiment of the present disclosure. Steerable sheath 1100 includes inner liner 1102 having pull wires 1104 and 1106 and electrode wires 1108, 1110, 1112, and 1114 disposed thereon. Torque transfer layer 1116 surrounds inner liner 1102, pull wires 1104 and 1106, and electrode wires 1108, 1110, 1112, and 1114. Steerable sheath 1000 further includes reflowed polymeric layer 1118 that surrounds torque transfer layer 1008. Electrode wires 1108, 1110, 1112, and 1114 may be connected to 4 separate electrodes (not shown in FIG. 10).

Although a number embodiments of this disclosure have been described above with a certain degree of particularity, those skilled in the art could make numerous alterations to the disclosed embodiments without departing from the spirit or scope of the disclosure. All directional references (e.g., upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of the disclosure. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the disclosure as defined in the appended claims.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

What is claimed is:

1. A steerable sheath having a proximal end and a distal end, the steerable sheath comprising:
    an inner liner extending from a proximal end of a non-deflectable portion of the steerable sheath to a distal end of a deflectable portion of the steerable sheath;
    a torque transfer layer surrounding the inner liner and extending from the proximal end of the non-deflectable portion of the steerable sheath to the distal end of the deflectable portion of the steerable sheath;
    a first polymeric layer having an outer circumferential surface and surrounding the torque transfer layer, the first polymeric layer extending from the proximal end of the non-deflectable portion of the steerable sheath to the distal end of the deflectable portion of the steerable sheath;
    a first electrode wire positioned on the outer circumferential surface of the first polymeric layer, the first electrode wire positioned along a first helical path from the proximal end of the non-deflectable portion to a distal end of the non-deflectable portion and positioned along a second helical path from a proximal end of the deflectable portion to the distal end of the deflectable portion;
    a second polymeric layer surrounding the first electrode wire, wherein the first and second polymeric layers are made of different materials, and wherein the first electrode wire is located at an interface between the first and second polymeric layers; and
    wherein the first electrode wire is electrically connected to a first electrode positioned on the deflectable portion.

2. The steerable sheath of claim 1, further comprising a third polymeric layer surrounding the first electrode.

3. The steerable sheath of claim 1, wherein the second helical path has a tighter wind than a wind of the first helical path.

4. The steerable sheath of claim 1, further comprising:
    a second electrode wire positioned on the outer circumferential surface of the first polymeric layer, the second electrode wire positioned along a third helical path from the proximal end to the distal end of the non-deflectable portion and positioned along a fourth helical path from the proximal end of the deflectable portion to the distal end of the deflectable portion, wherein the second electrode wire is electrically connected to a second electrode positioned on the deflectable portion.

5. The steerable sheath of claim 4, further comprising a third polymeric layer surrounding the second electrode.

6. The steerable sheath of claim 4, wherein the fourth helical path has a tighter wind than a wind of the third helical path.

7. The steerable sheath of claim 1 further comprising:
    a first pull wire positioned along a fifth helical path around a circumference of the inner liner from the proximal end of the non-deflectable portion to the distal end of the non-deflectable portion and along a first straight path from the proximal end of the deflectable portion to the distal end of the deflectable portion; and
    a second pull wire positioned along a sixth helical path around the circumference of the inner liner from the proximal end of the non-deflectable portion to the distal end of the non-deflectable portion and along a second straight path from the proximal end of the deflectable portion to the distal end of the deflectable portion.

8. The steerable sheath of claim 7, wherein the fifth helical path and the sixth helical path each complete two revolutions around the inner liner from the proximal end of the non-deflectable portion to the distal end of the non-deflectable portion.

9. The steerable sheath of claim 7, wherein the first pull wire and the second pull wire comprise flat wire, and wherein the first pull wire and the second pull wire are stainless steel pull wires.

10. The steerable sheath of claim 7, wherein the fifth helical path is offset from the sixth helical path by 180 degrees around the circumference of the inner liner.

11. The steerable sheath of claim 7, wherein the first straight path is offset from the second straight path by 180 degrees around the circumference of the inner liner.

12. The steerable sheath of claim 7, wherein the first pull wire and the second pull wire are in a polymeric tubular member.

13. The steerable sheath of claim 1, wherein the second polymeric layer includes a first polymer, a second polymer, and one or more lubricious additives.

14. The steerable sheath of claim 13, wherein the first polymer is a polyether block amide, and wherein the second polymer is a Nylon 11 polymer.

* * * * *